3,808,165
STABILIZED POLYVINYL ALCOHOL BINDER SOLUTION FOR WATER-FLUSHABLE NON-WOVEN WEBS
David V. Duchane, Menasha, Wis., assignor to Kimberly-Clark Corporation, Neenah, Wis.
No Drawing. Filed Aug. 21, 1972, Ser. No. 282,244
Int. Cl. C08f 29/26
U.S. Cl. 260—29.6 BM                9 Claims

ABSTRACT OF THE DISCLOSURE

A stabilized high solids content binder mixture for bonding non-woven webs to provide a water-flushable wrapper for absorbent pads such as sanitary napkins, diapers and the like. The mixture comprises an acidified solution of cold-water soluble polyvinyl alcohol containing an alkaline borate and a relatively unstable organic acid. The organic acid temporarily acidifies the solution to permit the polyvinyl alcohol to be utilized in a relatively high solids concentration in the presence of alkaline borate without premature gelling. Suitable organic acids include acetoacetic acid and acetone dicarboxylic acid. After the binder mixture is applied to a non-woven web, the heat used in drying breaks down the organic acid into acetone and carbon dioxide. The decomposition of the acid and subsequent escape of its constituents to the atmosphere raises the pH of the mixture whereby the borax cross-links with the polyvinyl alcohol to render it temporarily insoluble.

BACKGROUND OF THE INVENTION

In the production of flushable non-woven fiber webs for use with absorbent pads such as sanitary napkins and diapers, cold-water soluble polyvinyl alcohol is a preferred binder. However while polyvinyl alcohol binds the fibers strongly when the web is in dry condition, the binder loses strength rapidly upon exposure to the moisture-laden environment encountered during use. This can be corrected by crosslinking the polyvinyl alcohol with an alkaline borate such as borax, which will render the binder temporarily insoluble, while still permitting the binder to dissolve readily in an excess of water.

U.S. Pat. 3,654,928 which issued Apr. 11, 1972 teaches one method for such crosslinking. The method taught is a two step process in which the non-woven web is first bonded by the polyvinyl alcohol and the bonded web then treated with a borax solution. However, the borax tends to react only at the surface of the polyvinyl alcohol, thus reducing the effective degree of temporary insolubility.

In copending application Ser. No. 13,842 filed Feb. 24, 1970, now Pat. No. 3,689,314 which issued Sept. 5, 1972, there is described an improvement in which the alkaline borate is produced in situ from a formulation consisting primarily of polyvinyl alcohol, boric acid and sodium bicarbonate. After this formulation is applied to the non-woven web, the boric acid and sodium bicarbonate are reacted to form borax when heat is applied during the drying step. Upon the application of heat, the borax immediately cross-links throughout the polyvinyl alcohol structure to provide a uniform degree of temporary wet strength in the binder. However, this one-step borating process can only be used with a binder solution having a polyvinyl alcohol solids concentration of 4% or less. When the polyvinyl alcohol solids are present in the solution in larger amounts the solution gels prematurely.

In copending application Ser. No. 84,880 filed Oct. 28, 1970, now Pat. No. 3,692,725 which issued Sept. 19, 1972, there is described an improvement in the one-step borating process in which solutions containing up to about 12% polyvinyl alcohol solids may be used. This higher solids concentration is accomplished by using a boric acid/weak base mixture plus a strong acid in the solution and by saturating this strong-acid containing solution with carbon dioxide. However, this too has its disadvantages in that it is difficult to control the amount of dissolved $CO_2$ in the solution. In addition, it was found that when the binder solution is applied to the web by direct printing as is usually preferred, the $CO_2$ tends to escape too early and still causes premature gelling on the print roll during printing applications.

The present invention is directed to an improved binder mixture which permits a still higher concentration of polyvinyl alcohol solids to be used while avoiding the disadvantages mentioned above.

SUMMARY OF THE INVENTION

In accordance with this invention, an aqueous solution comprising a relatively high solids concentration of cold-water soluble polyvinyl alcohol containing boric acid and a weak base, or an already-formed alkaline borate, also has included in the solution a relatively unstable organic acid. The organic acid temporarily acidifies the solution sufficiently to inhibit gelling so that bonding of the non-woven web, especially print bonding, can be accomplished with a solution having a higher concentration of polyvinyl alcohol solids than hitherto possible. A preferred organic acid is acetoacetic acid. This acid decomposes rapidly at about 100° to yield acetone and carbon dioxide, both of which are volatile and flash off from the solution above that temperature. Another suitable unstable organic acid is acetone dicarboxylic acid, but at present this acid is quite expensive and therefore not as attractive from an economic standpoint. Both of these acids leave no residual salts when they decompose.

While acetoacetic acid is not readily available for use in its pre-prepared pure form because of its instability, it can readily be prepared in solution by alkaline hydrolysis of ethyl acetoacetate to form an alkaline salt of ethyl acetoacetate, and then subsequently converting the salt to its acid form with another acid. In this invention, the hydrolyzed ester and neutralizing acid are both incorporated in the polyvinyl alcohol solution used as the binder and the acetoacetic acid is thus formed in situ.

A typical binder solution may be formulated as follows: A dilute aqueous solution of ethyl acetoacetate and sodium hydroxide is reacted to provide a solution of the sodium salt of acetoacetic acid. Heat may be used to speed the reaction, but should be controlled so as not to decompose the product. In a separate vessel a dilute aqueous solution of an alkaline borate, such as borax is prepared, or alternatively a mixture of boric acid and a weak base may be used. In a third vessel an aqueous solution containing a high solids concentration of polyvinyl alcohol containing a small amount of glacial acetic acid is prepared. The borax, or the boric acid/weak base solution, is stirred into the acidified polyvinyl alcohol solution, followed by the addition of the hydrolyzed solution containing the sodium salt of acetoacetic acid. The mixture will not gel prematurely even when borax is added, because the presence of the glacial acetic acid keeps the pH of the solution down. When the sodium salt of acetoacetic acid is subsequently added, it reacts with the acetic acid to form sodium acetate and acetoacetic acid, and the acetoacetic acid formed prevents gelling. The binder solution thus prepared has a viscosity which permits handling on gravure printing equipment. When this mixture is applied to a carded web, and then heated in order to evaporate the water and to dry the treated web, the acetoacetic acid formed in situ by the reaction of the sodium salt of acetoacetic acid and the glacial acetic acid, breaks down into acetone and $CO_2$, both of which volatilize and are driven off. With the decomposition of the unstable organic acid, in this case acetoacetic acid, the pH of the binder rises, and if borax is used in the binder solution, the borax cross-links with the polyvinyl alcohol to render it temporarily insoluble. If a mixture of boric acid and a weak base is used, the boric acid and weak base react to form an alkaline borate, and the alkaline borate in turn cross-links with polyvinyl alcohol to render it temporarily insoluble.

DESCRIPTION OF THE PREFERRED EMBODIMENTS

In one specific example, an aqueous solution of 13% polyvinyl alcohol was prepared and about 0.5% glacial acetic acid added thereto. In a separate vessel an aqueous solution of 8.5% ethyl acetoacetate and 2.6% sodium hydroxide was heated to 55° C. for two hours to hydrolyze the ethyl acetoacetate to the sodium salt of ethyl acetoacetate, and then allowed to cool to room temperature. In another vessel, an aqueous solution of 4% borax was prepared. The borax solution was stirred into the polyvinyl alcohol/acetic acid solution and then the hydrolyzed ethyl acetoacetate was added while the stirring continued. The resulting binder solution contained the following ingredients:

| | Percent |
|---|---|
| Cold-water soluble polyvinyl alcohol | 10.0 |
| Borax | 0.4 |
| Acetoacetic acid source: | |
|    Sodium salt of ethyl acetoacetate | 0.8 |
|    Glacial acetic acid | 0.4 |
| Balance water. | |

The pH of the solution of was about 5.

It should be noted that while the list of ingredients in the above formula does not include acetoacetic acid per se, acetoacetic acid is present by virtue of being produced in the solution by reaction of the sodium salt of acetoacetic acid (or hydrolyzed ethyl acetoacetate) with the glacial acetic acid. Of course, if hydrolysis is incomplete, some residual ethyl acetoacetate can remain in the binder mixture, but this was found to have no detrimental effect.

The above-described binder mixture had a working viscosity and was not unduly tacky. The binder was applied to a bonded carded web by means of a patterned gravure roll and the resulting web was found to have improved temporary wet strength when compared to a web similarly bonded with polyvinyl alcohol having no cross-linking.

As indicated in one of the previously mentioned prior art patents it has been found that a borated polyvinyl alcohol binder provides the bonded non-woven web with a better balance of properties if the binder is plasticized. This is also true in the present invention. Accordingly, the preferred binder solution of this invention also contains a plasticizer. In an example using the same ingredients as the foregoing example, 1.0% of a polypropylene glycol having a molecular weight of about 425 was also added. The pH of this solution was also about 5. A carded web substrate having a basis weight of 14 grams per square yard and comprising $1\tfrac{9}{16}''$ rayon fibers of 1.5 denier was gravure printed with spaced wave-like lines of art patents it had been found that a borated polyvinyl alcohol binder provides the bonded non-woven web with a binder-printed web of similar construction but in which unmodified polyvinyl alcohol was used as the binder.

Comparative test data for the two webs are shown below:

| | Adhesive used | |
|---|---|---|
| | Polyvinyl alcohol (unmodified) | Borated polyvinyl alcohol (acetoacetic acid modified) and plasticized |
| Tensile (lb./in.): | | |
|   M.D. | 4.9 | 4.5 |
|   C.D. | 0.43 | 0.42 |
| Burst strength (g./cm.²): | | |
|   Dry | 179 | 205 |
|   100% moist | 12 | 72 |
|   200% moist | 10 | 38 |
|   500% moist | 15 | 20 |
|   Saturated, 30 sec. | 0 | 3 |
|   Saturated, 1 min. | 0 | 0 |

The results show that while the two webs have similar strengths while dry, the web bonded with the borated polyvinyl alcohol retains much more of its strength while damp. This is especially significant and useful at the 100%–200% moisture level such as frequently occurs in a sanitary napkin wrapper during use. At this moisture content, the wrapper bonded with the borated and plasticized adhesive of this invention is about 4 to 6 times as strong as that bonded with polyvinyl alcohol alone. It can also be seen that in spite of its superior strength at intermediate moisture levels, the borated wrap rapidly loses all strength after a short time when saturated, or disposed of, in excess water.

As noted in the earlier patents, in addition to the polypropylene glycol mentioned, useful plasticizers also include other polyglycols of intermediate molecular weight, such as polyethylene glycol having a molecular weight of about 300, and methoxypolyethylene glycol having a molecular weight of about 350.

The polyvinyl alcohol employed in the examples described above was of a type which was about 87–89% hydrolyzed, had a viscosity of about 22 cps. (4% solution at 20° C.), and was readily soluble in cold water. Other polyvinyl alcohols were also found to perform well as long as they were cold-water soluble. For example, polyvinyl alcohols having a percent hydrolysis in the range of 74 to about 98 are generally cold-water soluble and are suitable for the described use.

In addition to the organic acid mentioned in the examples, i.e., acetoacetic acid, another unstable organic acid which may be used is acetone dicarboxylic acid (also known as 3-oxo-glutaric acid). A suitable acid may be generically described as one which breaks down into a volatile organic compound and carbon dioxide at about 100° C. In the case of these two acids, the volatile organic compound is acetone.

In another specific example the aforementioned acetone dicarboxylic acid was employed as follows:

An aqueous solution of 7.2% polyvinyl alcohol and 0.8% methoxypolyethylene glycol having a molecular weight of 350 was prepared. To this was added acetone dicarboxylic acid in the amount of 0.25%, at which stage the pH of the solution was about 5. 0.4% $H_3BO_3$ and 0.28% $NaHCO_3$ were then added to the solution and the entire mixture stirred thoroughly. No glacial acetic acid, or other supplementary acid, was needed in this solution because the dicarboxylic acid, unlike the acetoacetic acid, is in the acid form rather than the salt form when added to the formulation and thus maintains the pH sufficiently low to prevent gelling. This binder solution maintained a viscosity which was not unduly tacky and permitted gravure printing. The binder was applied to a non-woven web of the type previously described and in the manner previously described. Upon testing the web it was found to have a burst strength of 151 g./cm.² when dry; a burst strength of 42 g./cm.² at 100% moisture; 21 g./cm.² at 500% moisture; and when saturated with water a burst strength of 6.8 g./cm.$^2$ at ½ minute and 0 at 1 minute.

In a similar example, when 0.72% acetone dicarboxylic acid was used, burst strength was measured at 179 when dry; 59 at 100% moisture; 17 at 500% moisture; and when saturated 3.0 at ½ minute, 2.0 at 1 min., and 0 at 2 min.

As indicated earlier when acetone dicarboxylic acid is used as the unstable organic acid it is not necessary to add glacial acetic acid to maintain pH in the presence of the alkaline borate. However, glacial acetic acid, or some other acid capable of maintaining the pH at less than about 6 in the presence of an alkaline borate is necessary when the sodium salt of ethyl acetoacetate is used in order to form acetoacetic acid. While glacial acetic acid is preferred for this purpose, any other relatively strong organic or inorganic acid may be used. Among these are phosphoric, hydrochloric, malic, fumaric, etc.

Also, instead of using a borax solution, a mixture of boric acid and a weak base such as sodium bicarbonate may be used in the binder solution.

When such a mixture is used the sodium bicarbonate should be present in an amount sufficient to form borax when reacted completely with the boric acid. Use of more than this amount of sodium bicarbonate tends to cause gelation of the solution as it raises the pH. Less sodium bicarbonate may be used but this results in a diminution of advantageous wet strength properties as the amount is lowered.

The boric acid in the described mixture should be present in the range of from about 2 to 10% based on the PVA. This calculates out to a range of about 0.08% to 1.5% of the adhesive formulation. The preferred amount of boric acid is about 5% of the PVA, or from 0.2% to 0.75% of the adhesive formulation. This calculates out to an alkaline borate (as sodium in this case) present in the range of from about 1.6% to 8% based on the PVA or about 0.064% to about 1.2% of the adhesive formulation. The preferred amount of alkaline borate is about 4% of the PVA or 0.16% to 0.60% of the adhesive formulation.

When borax is added directly, it should be present in the same concentration as when formed in situ by the addition of boric acid and sodium bicarbonate.

While emphasis throughout this specification has been on the use of borax or a mixture which reacts to form borax when heated, it has also been found as described in the patents mentioned earlier, that forms of alkaline borate other than borax will produce the desired results. For example, other soluble bicarbonates such as potassium or ammonium bicarbonate may be substituted for the sodium bicarbonate in the boric acid mixture whereupon the resulting borate will be the potassium or ammonium salt respectively. Other weak bases may also be used in place of the sodium bicarbonate including organics such as the primary and secondary amines, including monoethanolamine, diethanolamine and piperidine, which in combination with boric acid will produce alkaline borates. The alkaline borates which result may also be used directly in the solution as with the borax mentioned in the specific examples.

The concentration of polyvinyl alcohol in the preferred binder of this invention is unusually high in view of the presence of an alkaline borate, especially since an alkaline borate tends to cause gelling if no compensations are made. In fact, solids concentration equal to the maximum concentrations which can be obtained when a solution containing polyvinyl alcohol alone is employed, may be used in the binder solution, i.e. as high as 15%. For maximum efficiency, it is desired that the highest solids concentration possible be used in the binder solution. With this invention the percent solids in polyvinyl alcohol solutions containing alkaline borates may be increased from the previous possible high of about 12% to up to about 15%. However, even when lower solids solutions are used, such as the 10% and 7% solutions set forth in the examples, the binder is also much more stable than has been found possible by employing previously known techniques, particularly with regard to viscosity and tackiness and the difficulties encountered with the prior art use of carbon dioxide gas are avoided. For use with gravure printing for example a range of 4–15% polyvinyl alcohol solids may be effectively used, depending upon how heavy an application of binder is desired on the finished product.

The finished webs are especially suitable for sanitary napkin wrappers, however, it will readily be seen that the web may be used in connection with other disposable absorbent pads such as diapers, bed pads, bandages and the like.

While in each of the specific examples the pH measured was about 5, it is understood that the pH may vary and be as high as 6 without detriment to the mixture. The lower limit is not critical except with respect to minimizing the possibility of corrosive effects on equipment.

What is claimed is:

1. A binder for non-woven webs comprising an acidified aqueous solution containing from 4 to 15% cold-water soluble polyvinyl alcohol solids, an alkaline borate in the amount of 1.6% to 8% based on the polyvinyl alcohol, and an amount of unstable organic acid sufficient to maintain the pH of said solution at no more than about 6, said unstable organic acid being characterized by the fact that it breaks down into a volatile organic compound and carbon dioxide at about 100° C., said unstable acid being selected from the group consisting of acetoacetic acid and acetone dicarboxylic acid.

2. The binder of claim 1 wherein said unstable acid is acetoacetic acid and wherein said acid is formed by including in said solution a mixture obtained by first reacting ethyl acetoacetate and sodium hydroxide, and adding the reacted mixture to the polyvinyl alcohol solution previously acidified by a strong acid.

3. The binder of claim 2 wherein said strong acid is glacial acetic acid.

4. The binder of claim 1 wherein said alkaline borate is borax.

5. The binder of claim 1 wherein said alkaline borate is formed in situ by adding to said solution boric acid and a weak base, said weak base being present in an amount sufficient to react completely with said boric acid.

6. The binder of claim 5 wherein said weak base is selected from a soluble bicarbonate, and a primary or secondary amine.

7. The binder of claim 6 wherein said soluble bicarbonate is sodium bicarbonate.

8. The binder of claim 6 wherein said amine is selected from the group consisting of monoethanolamine, diethanolamine, and piperidine.

9. The binder of claim 1 wherein said binder also contains as a plasticizer a polyglycol of intermediate weight.

References Cited

UNITED STATES PATENTS

| | | | |
|---|---|---|---|
| 3,692,725 | 9/1972 | Duchane | 260—29.6 BM |
| 3,654,928 | 4/1972 | Duchane | 260—27.6 BM |
| 3,689,314 | 2/1972 | Duchane | 117—62.2 |

WILLIAM H. SHORT, Primary Examiner

P. F. KULKOSKY, Assistant Examiner

U.S. Cl. X.R.

117—161 UE; 128—290

UNITED STATES PATENT OFFICE
CERTIFICATE OF CORRECTION

Patent No. 3,808,165                     Dated April 30, 1974

Inventor(s) David V. Duchane

It is certified that error appears in the above-identified patent and that said Letters Patent are hereby corrected as shown below:

Column 3, line 76 to Column 4, line 1, delete "art patents it had been found that a borated polyvinyl alcohol binder provides the bonded non-woven web" and insert -- the plasticized binder in the amount of 7% polyvinyl alcohol by weight of fiber. This web was compared --.

Signed and sealed this 19th day of November 1974.

(SEAL)
Attest:

McCOY M. GIBSON JR.
Attesting Officer

C. MARSHALL DANN
Commissioner of Patents